L. M. PRATT.
TREADMILL.
APPLICATION FILED APR. 4, 1919.

1,330,091. Patented Feb. 10, 1920.

Inventor
L. M. Pratt
By C. A. Snow & Co.
Attorneys.

Witness

UNITED STATES PATENT OFFICE.

LEWIS MORAN PRATT, OF ELDORADO, KANSAS.

TREADMILL.

1,330,091.  Specification of Letters Patent.  Patented Feb. 10, 1920.

Application filed April 4, 1919. Serial No. 287,504.

*To all whom it may concern:*

Be it known that I, LEWIS M. PRATT, a citizen of the United States, residing at Eldorado, in the county of Butler and State of Kansas, have invented a new and useful Treadmill, of which the following is a specification.

This invention relates to tread mills and has for its object the provision of a device of that kind in which the power of a motor propelled vehicle as delivered to the traction wheels may be utilized for other useful work, such for instance, as pumping water, sawing wood or other operations requiring motor power.

With the above object in view the invention consists of a frame on which the rear axle of an automobile may be supported so that power delivered from the engine to the tread of the traction wheels will be transmitted to a belt wheel to be delivered to any machine it is desired to operate. Novel means for retaining the rear axle in place on the frame is also provided.

With these and other objects in view as will appear as the description proceeds, the invention resides in the novel combination and arrangement of parts to be more fully pointed out in the annexed specification and claims, it being understood that minor changes may be made without departing from the spirit or sacrificing any of the advantages of the invention.

In the drawing:—

Figure 1:
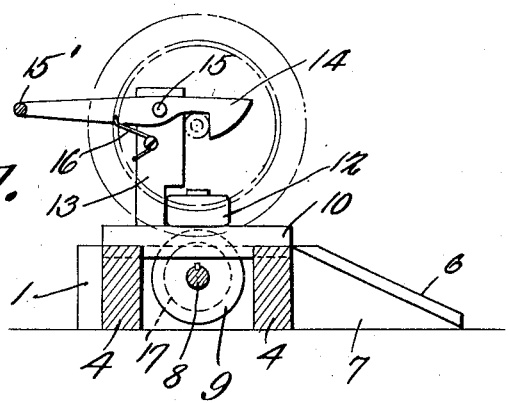
Figure 1 is a view in sectional elevation.
Figure 2:
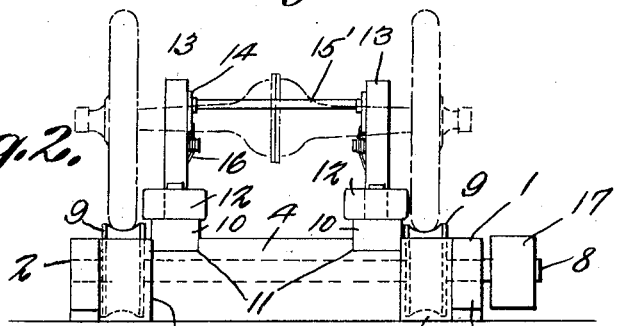
Fig. 2 is an end view.
Figure 3:
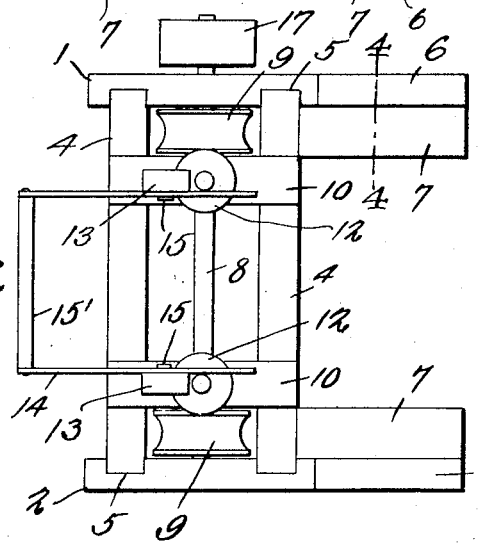
Fig. 3 is a plan view.
Figure 4:
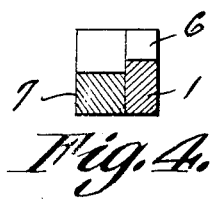
Fig. 4 is a detail sectional view on line 4—4 of Fig. 3.

Referring to the drawing in which like reference characters refer to like parts throughout the several figures, the numerals 1 and 2 designate the sills of the frame, having cross timbers 4 mortised as at 5 into the sills 1 and 2. The timbers 1 and 2 are beveled at one end as shown at 6 and a block 7 likewise beveled is fitted against the inner faces of the sills 1 and 2, with its large end abutting the cross timber 4. The beveled portion of the block 7 is stepped with relation to the incline 6 for a purpose that will presently appear. A shaft 8 adapted for rotation in bearings in the sills 1 and 2 has secured near its ends and adjacent the sills 1 and 2, grooved wheels 9 which are adapted to receive the tread of an automobile wheel.

Figure 5:
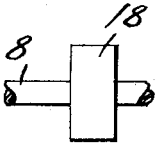
Fig. 5 is a modified form of roller used with the device.

Beams 10 are mortised as indicated at 11 into the cross beams 4 and extend parallel with the sills 1 and 2, spaced therefrom a distance sufficient to permit free rotation of the wheels 9 therebetween. Flat faced rollers 12 are mounted on the beams 10 with their centers of rotation directly over the center of the shaft 8 and are adapted to serve as a guide for the edge of the automobile tire to assist in preventing lateral displacement of the automobile wheel from the grooved wheel 9. Standards 13 are mounted on the beams 10 and serve as an abutment for the axle of the automobile when the automobile is in position for delivering power to the shaft 8. A pair of latches 14 are pivoted at 15 to the standards 13, rearward extensions of the latch members are connected by a bar 15' which serves as a means of manipulating the latches, tension springs 16 tend at all times to force the latch end downwardly to engage the automobile axle. The shaft 8 is provided with a belt pulley 17 for taking off power as desired. Flat faced wheels 18 as shown in Fig. 5 may be fixed to the shaft 8 to take the place of the grooved wheels 9.

In using the device herein disclosed, the automobile will be backed up the incline of the block 7, the stepped portion 6 of the beams 1 and 2 serving to properly direct the wheels toward the grooved wheels 9, as the axle moves toward the standards 13 the inclined portion of the latches 14 are engaged by the axles to elevate the latch, when the axle strikes the abutting standards 13 the latch snaps over the axle and secures the same in position, the automobile wheels resting on the grooved wheels 9, directly over the shaft 8. In this way the entire rear weight of the automobile is brought to bear on the grooved wheels 9 and the full power of the engine is delivered through the rear wheels to the shaft 8 and to the belt pulley 17.

Having thus described the invention, what is claimed is:—

1. In a device of the class described, a frame, a shaft mounted for rotation on the frame, tread wheels fixed to the shaft and adapted to engage and support the rear wheels of a motor vehicle, an inclined plane for elevating said wheels to position on the tread wheels, a standard carried by the frame and adapted to engage the axle of the motor vehicle and a latch carried by the standard and adapted to secure the said axle to the standard.

2. In a device of the class described, a frame, a shaft extending transversely of the frame and mounted for rotation thereon, a pair of tread engaging wheels secured to the shaft, an inclined runway secured to the frame and adapted to mount the rear wheels of a motor vehicle on the tread wheels, a stop secured to the frame and adapted to engage the rear axle of a motor vehicle, a latch carried by the stop and adapted to automatically lock the axle to the stop, rim engaging rollers secured to the frame and adapted to contact the rim of the vehicle wheel to prevent lateral displacement thereof, and a belt pulley secured to the shaft to deliver power transmitted from the vehicle wheels to the tread wheels.

3. In combination with the traction wheels and axle of a motor propelled vehicle, of a frame comprising lower side beams and cross beams, a shaft journaled on the said side beams, wheels fixed to the shaft and adapted to engage the tread of the vehicle wheels, a belt pulley carried by the shaft, a second pair of side beams secured to the cross beams, standards mounted on the second beams in position to stop the vehicle axle over the shaft, a latch pivoted to the standard and adapted to engage and lock the axle to the standard, rim engaging rollers mounted on the second beams and adapted to engage the rim of the vehicle wheels, and a runway for elevating and directing the vehicle wheels to position on the tread wheels, said runway comprising a beveled end formed on the lower side beams and an inclined block secured to the side beams adjacent the inclined end thereof, the incline of the block being on a lower plane than that of the side beam.

In testimony that I claim the foregoing as my own, I have hereto affixed my signature in the presence of two witnesses.

LEWIS MORAN PRATT.

Witnesses:
 JAS. W. WRIGHT,
 GUY M. BECK.